US010752978B2

(12) United States Patent
Hardy et al.

(10) Patent No.: US 10,752,978 B2
(45) Date of Patent: Aug. 25, 2020

(54) NICKEL-BASE SUPERALLOY AND USE THEREOF

(71) Applicant: ROLLS-ROYCE plc, London (GB)

(72) Inventors: Mark C. Hardy, Derby (GB); Grant J. Gibson, Derby (GB); Gavin J. Baxter, Sheffield (GB); Yogiraj Pardhi, Derby (GB)

(73) Assignee: ROLLS-ROYCE plc, London (GB)

( * ) Notice: Subject to any disclaimer, the term of this patent is extended or adjusted under 35 U.S.C. 154(b) by 381 days.

(21) Appl. No.: 15/696,516

(22) Filed: Sep. 6, 2017

(65) Prior Publication Data

US 2018/0073106 A1   Mar. 15, 2018

(30) Foreign Application Priority Data

Sep. 13, 2016 (GB) .................................. 1615496.5

(51) Int. Cl.
| | |
|---|---|
| *C22C 19/05* | (2006.01) |
| *B33Y 10/00* | (2015.01) |
| *B33Y 70/00* | (2020.01) |
| *B33Y 80/00* | (2015.01) |
| *B23K 26/342* | (2014.01) |
| *B23K 15/00* | (2006.01) |
| *C22C 1/02* | (2006.01) |

(52) U.S. Cl.
CPC ........ *C22C 19/057* (2013.01); *B23K 15/0086* (2013.01); *B23K 26/342* (2015.10); *B33Y 10/00* (2014.12); *B33Y 70/00* (2014.12); *B33Y 80/00* (2014.12); *C22C 1/023* (2013.01); *C22C 19/05* (2013.01)

(58) Field of Classification Search
CPC .. B23K 15/0086; B23K 26/342; B33Y 10/00; B33Y 70/00; B33Y 80/00; C22C 19/05; C22C 19/057; C22C 1/023
USPC ......................................................... 219/76.1
See application file for complete search history.

(56) References Cited

U.S. PATENT DOCUMENTS

| | | | | |
|---|---|---|---|---|
| 5,916,382 | A | * | 6/1999 | Sato ...................... C22C 19/056 148/404 |
| 6,740,292 | B2 | | 5/2004 | Arrell et al. |
| 2004/0221925 | A1 | | 11/2004 | Tamaki et al. |

(Continued)

FOREIGN PATENT DOCUMENTS

| | | |
|---|---|---|
| EP | 1359231 A1 | 11/2003 |
| EP | 2949768 A1 | 12/2015 |

(Continued)

OTHER PUBLICATIONS

Mar. 23, 2017 Search Report issued in British Patent Application No. 1615496.5.

(Continued)

*Primary Examiner* — Dana Ross
*Assistant Examiner* — Joseph W Iskra
(74) *Attorney, Agent, or Firm* — Oliff PLC

(57) ABSTRACT

The novel nickel-base superalloy useful in an additive manufacturing process or a powder-based manufacturing process includes the following composition in wt %: Cr 8.0-8.5; Co 9.0-9.5; Mo 0.4-0.6; W 9.3-9.7; Ta 2.9-3.6; Al 4.9-5.6; Ti 0.2-1.0; Hf 0-0.05; C 0.005-0.03; B 0.005-0.02; Zr 0.005-0.1; Nb 0.2-1; Mn 0-0.6; and S 0-0.002 (≤20 ppm); the balance nickel and incidental elements and unavoidable impurities.

19 Claims, 2 Drawing Sheets

(56) References Cited

U.S. PATENT DOCUMENTS

| | | | |
|---|---|---|---|
| 2005/0067062 A1* | 3/2005 | Yoshinari | C22C 19/057 148/428 |
| 2007/0235110 A1* | 10/2007 | Yoshinari | C22C 19/057 148/428 |
| 2008/0101981 A1 | 5/2008 | Arrell et al. | |
| 2010/0059146 A1 | 3/2010 | Sato et al. | |
| 2010/0266772 A1* | 10/2010 | Hu | B23K 20/02 427/328 |
| 2011/0052443 A1 | 3/2011 | Hanlon et al. | |
| 2013/0142637 A1* | 6/2013 | Harris | C22C 19/057 415/200 |
| 2014/0034626 A1 | 2/2014 | Illston | |
| 2014/0366996 A1* | 12/2014 | Goncharov | B23K 1/005 148/528 |
| 2016/0167172 A1 | 6/2016 | Goncharov et al. | |

FOREIGN PATENT DOCUMENTS

| | | |
|---|---|---|
| EP | 3 034 639 A1 | 6/2016 |
| WO | 2016/012399 A1 | 1/2016 |
| WO | 2016-146560 A1 | 9/2016 |

OTHER PUBLICATIONS

Jan. 31, 2018 Search Report issued in European Patent Application No. 17 18 9326.

* cited by examiner

NICKEL-BASE SUPERALLOY AND USE THEREOF

FIELD OF THE INVENTION

The present invention relates to a nickel-base superalloy and the use thereof in the fabrication of metallic articles, components and structures, for example aerospace components. In one example, the nickel-base superalloy can be used to fabricate metallic articles in an additive manufacturing process or a powder-based manufacturing process.

BACKGROUND OF THE INVENTION

Gamma-prime ($\gamma'$) precipitation-strengthened nickel-base superalloys such as IN738LC, MAR-M 247 and CM247LC are known, which are designed to be resistant to creep deformation for high-temperature applications up to about 950° C. to 1050° C.

Such superalloys, however, are difficult to weld due to their sensitivity to microcracking. Microcracking of nickel-base superalloys during welding is generally attributable to solidification cracking in the mushy zone, liquation of precipitates or low-melting point eutectics in the heat-affected zone (HAZ), ductility dip cracking or strain-age cracking in subsequent heat treatment and embrittlement of the HAZ by segregation of detrimental impurities at interfaces.

B Geddes et al., "Superalloys, Alloying and Performance", ASM International, 2010, pages 71 to 72, the contents of which are incorporated herein by reference, describe a weldability limit for superalloys where [2 times Al concentration in wt %+Ti concentration in wt %] is approximately 6.0. Superalloys above this limit are considered as difficult to weld materials. Solidification and grain boundary liquation cracking occurs during the welding process of such materials, whereas post-weld heat treatments often lead to strain age cracking in gamma-prime $Ni_3(Al, Ti)$ precipitate strengthened alloys.

Generally speaking, strain-age cracking can be due to volume changes from gamma-prime precipitation, which occur during repeated thermal cycles and give rise to significant residual stresses. Solidification cracking can be caused by the presence of residual liquid during thermal cycles. Constitutional liquation cracking can be caused by rapid heating of relatively low melting point phases, such as carbides, borides and gamma-prime, at interfaces and interdendritic regions. Interface embrittlement from sulphur as a result of low melting point $Ni_3S_2$, which can "wet" interfaces and grain boundaries and give rise to brittle intergranular fracture for a range of temperatures, can also cause cracking in nickel-base superalloys. These problems have restricted the development of processes for fast and convenient fabrication of relatively complex metal articles, components and structures, for example using additive manufacturing processes such as three-dimensional (3D) printing, because the repeated thermal cycles encountered in such processes create stresses that will cause cracks to appear in the crack-prone metal. In addition, the conventional nickel-base superalloys produce metal products that are likely to show low levels of ductility from tensile loading and creep deformation, notably over temperatures between about 650° C. and 1050° C. These problems are typically caused by damage from inelastic strain localised to interfaces, for example grain boundaries, and the gamma-phase precipitates.

European Patent Application No. 2949768, the contents of which are incorporated herein by reference, describes a nickel-base superalloy in which the ratios of the alloying elements C, B, Hf, Zr and Si are as follows:

| C/B | 10-32 |
| C/Hf | >2 |
| C/Zr | >8 |
| C/Si | >1, | for example in an alloy consisting of the following components (wt %):

| Cr | 7.7-8.3 |
| Co | 5.0-5.25 |
| Mo | 2.0-2.1 |
| W | 7.8-8.3 |
| Ta | 5.8-6.1 |
| Al | 4.7-5.1 |
| Ti | 1.1-1.4 |
| C | 0.08-0.16, preferably 0.09-0.16, most preferably 0.13-0.15 |
| B | 0.005-0.008, preferably most preferably 0.005-0.008 |
| Hf | 0-0.04, preferably 0-0.01, most preferably 0 |
| Zr | 0-0.01, most preferably 0 |
| Si | 0-0.08, preferably 0-0.03, most preferably 0, | the balance nickel and unavoidable impurities.

The alloy is in the form of a powder wherein the powder size distribution is between 10 and 100 µm and a spherical morphology.

Such a superalloy powder is said to be suitable for additive manufacturing of metallic articles, for example by selective laser melting (SLM) or electron beam melting (EBM). In particular, the addition of carbon as a grain-boundary strengthener in preference to B, Hf and Zr as possible alternative grain-boundary strengtheners is said to improve crack-free processing by additive manufacturing methods. The superalloy is a modified version of the nickel-base superalloy "L1" disclosed in European Patent Application No. 1359231 ("A1" in the corresponding U.S. Pat. No. 6,740,292), which corresponds to it in the amounts of the components Cr, Co, Mo, W, Ta, Al, Ti, C and B and differs from it in that "L1" ("A1") has 0.02 wt % C, 0.005 wt % B, higher amounts of Hf and Si and no Zr.

The above proposal may go some way towards providing additive manufacturing processes using an alternative to "L1". However, it does not address the desirability of improving the cracking resistance of other nickel-base superalloys during high temperature manufacture, processing or use.

The present invention is based on our surprising finding that by controlled adjustment of a specific combination of components in the nickel-base superalloy CM247LC, a novel alloy is obtained which combines the strength advantages conferred by the presence of large volumes of gamma-prime precipitation with a reduced propensity for cracking during high temperature manufacture, processing or use. As a result, the novel modified form of the superalloy CM247LC enables this alloy to be fabricated into metallic articles, components and structures using a variety of high temperature forming processes, including additive manufacturing methods and powder-based manufacturing methods, including methods where thermal cycling is expected.

CM247LC is described in Harris et al., "MAR-M 247 Derivations—CM247LC DS Alloy, CMSX Single Crystal Alloys, Properties and Performance", 5th Intl. Symposium, October 1984, pages 221-230, the contents of which are incorporated herein by reference. Its nominal composition is as follows:

| | |
|---|---|
| Cr | 8.1 |
| Co | 9.2 |
| Mo | 0.5 |
| W | 9.5 |
| Ta | 3.2 |
| Al | 5.6 |
| Ti | 0.7 |
| Hf | 1.4 |
| C | 0.07 |
| B | 0.015 |
| Zr | 0.015 | the balance nickel and unavoidable impurities. Upper limits of manganese (Mn), sulphur (S) and niobium (Nb) in CM247LC are generally Mn 0.05 wt % max, S 0.003 wt % max, and Nb 0.10 wt % max.

BRIEF DESCRIPTION OF THE INVENTION

In one aspect, the present invention provides a nickel-base superalloy comprising the following composition in wt %:

| | |
|---|---|
| Cr | about 8.0-about 8.5, for example 8.00-8.50 |
| Co | about 9.0-about 9.5, for example 9.00-9.50 |
| Mo | about 0.4-about 0.6, for example 0.40-0.60 |
| W | about 9.3-about 9.7, for example 9.30-9.70 |
| Ta | about 2.9-about 3.6, for example 3.1-3.5, for example 3.10-3.50 |
| Al | about 4.9-about 5.6, for example 5.1-5.5, for example 5.10-5.50 |
| Ti | about 0.2-about 1.0, for example 0.5-0.9, for example 0.50-0.90 |
| Hf | 0-about 0.05, for example 0-0.05 |
| C | about 0.005-about 0.03, for example 0.005-0.02, for example 0.005-0.015 |
| B | about 0.005-about 0.02, for example 0.005-0.02, for example 0.005-0.015 |
| Zr | about 0.005-about 0.1, for example 0.005-0.02, for example 0.005-0.015 |
| Nb | about 0.2-about 1, for example 0.4-1, for example 0.4-1.0 |
| Mn | 0-about 0.6, for example 0 |
| S | 0-about 0.002 (≤20 ppm), for example 0-about 0.0005 (≤5 ppm) | the balance nickel and incidental elements and unavoidable impurities.

Optional incidental elements which may be present in the new superalloy of the present disclosure can, for example, be selected from the following (wt % unless indicated to be ppm):

| | |
|---|---|
| V | 0.10 max |
| Fe | 0.05 max |
| Si | 0.05 max |
| P | 0.005 max |
| Mg | 0.005 max |
| Cu | 0.01 max |
| N | 60 ppm max |
| O | 250 ppm max |
| Ag | 1 ppm max |
| As | 5 ppm max |
| Bi | 0.1 ppm max |
| Cd | 2 ppm max |
| Ga | 25 ppm |
| In | 0.2 ppm max |
| Pb | 2 ppm max |
| Sb | 2 ppm max |
| Se | 1 ppm max |
| Sn | 10 ppm max |
| Te | 0.1 ppm max |
| Tl | 0.2 ppm max |
| Zn | 5 ppm max. |

Impurities of V, Fe, Si, P, Mg, Cu, N, O, Ag, As, Bi, Cd, Ga, In, Pb, Sb, Se, Sn, Te, Tl and/or Zn should preferably be within the above stated maximum amounts for each respective element.

It will be noted that the maximum sulphur (S) content (0.002 wt %) is lower than the maximum generally considered acceptable for CM247LC, which is 0.003 wt %. The maximum manganese (Mn) content (about 0.6 wt %) is higher than the maximum generally considered acceptable for CM247LC, which is 0.05 wt %. The niobium (Nb) content (about 0.2 to about 1 wt %) is higher than the content generally considered acceptable for CM247LC, which is max 0.10 wt %. The boron range (about 0.005-about 0.02 wt %) is broader than the range generally considered acceptable for CM247LC which is 0.010 to 0.020 wt %. Other maxima listed above generally correspond to the maxima considered acceptable for CM247LC.

Generally speaking, impurities of any other element should be within a maximum for that element of about 0.001 wt %.

The nickel-base superalloy according to the first aspect of the present invention may be in a physical form suitable for use in an additive manufacturing process. For example, the nickel-base superalloy according to the first aspect of the present invention may be in the physical form of a wire, rod, other suitably shaped metal body, or a powder, suitable for use in a directed energy deposition (DED) additive manufacturing process, such as, for example, laser-based additive manufacturing (LBAM) including direct laser deposition (DLD), electron beam additive manufacturing (EBAM), laser engineered net shaping (LENS), selective laser melting (SLM), SLM three-dimensional printing (SLM 3D printing), direct metal laser sintering (DMLS), direct metal laser sintering three-dimensional printing (DML 3D printing), electron beam melting (EBM), direct metal deposition (DMD), direct metal tooling (DMT), direct metal tooling three-dimensional printing (DMT 3D printing), construction laser additive direct (CLAD) and ion fusion formation (IFF).

Generally speaking, in an additive manufacturing process for creating a metal article, component or structure, metal powder or a metal body such as, for example a rod or wire, is fed into a melt pool that is heated, typically by a laser, electron beam or plasma arc. The machine head moves the heat source and metal feed to deposit layers of metal in the desired shape, supported on a substrate or bed, which is suitably metallic. The process typically occurs in a vacuum or inert atmosphere to restrict oxidation of the metals. For further information please refer to "Additive Manufacturing Technologies" by Gibson, Rosen and Stucker (2015), published by Springer, the contents of which are incorporated herein by reference. For example, a review of directed energy deposition (DED) processes is contained in Gibson et al., "Directed Energy Deposition Processes", on pages 245-268 of the said "Additive Manufacturing Technologies"; the contents of that chapter are also specifically incorporated herein by reference. Also, C K Chua et al., "3D Printing and Additive Manufacturing" 4th Edition (2014), published by World Scientific Publishing Co.

The nickel-base superalloy according to the first aspect of the present invention may be in the physical form of a powder suitable for use in a powder-based manufacturing process, such as, for example, hot isostatic pressing (HIP).

Generally speaking, in a powder-based manufacturing process a metal powder, which may be a shaped powder pre-form, is subjected to heat and pressure to melt or sinter the metal powder particles together to form the desired article, component or structure. For further information please refer to "Powder Metallurgy Technology" by G S Upadhyaya, Cambridge Int Science Publishing (1997); also "Powder Metallurgy", Chapter 4 in "A Textbook of Manufacturing Technology: Manufacturing Processes" by R K Rajput (2007); also "Powder Metallurgy; Science, Technology and Applications", P C Angelo and R Subramanian (2008), pub. PHI Learning Pvt. Ltd.; also W B James, "Powder Metallurgy Methods and Applications", in ASM Handbook (Ed. P Samal and J Newkirk), volume 7 (2015) pages 9 to 19, the contents of which are incorporated herein by reference.

In a second aspect, the present invention provides a metal article, component or structure comprising or formed from the nickel-base superalloy according to the first aspect of the invention.

The metal article or structure according to the second aspect of the present invention may, for example, be selected from aerospace components, including statics, turbine components such as turbine blades and combustor components for use in the aerospace industry.

In a third aspect, the present invention provides a method of manufacturing a metal article, component or structure according to the second aspect of the present invention, which comprises using the applying energy to melt the nickel-base superalloy according to the first aspect of the present invention, wherein the nickel-base superalloy is in the physical form of a powder and the energy is applied in a powder-based manufacturing process, or the nickel-base superalloy is in the physical form of a metal body or a powder used as a metal feed in an additive manufacturing process, for example a directed energy deposition (DED) additive manufacturing process.

The powder-based manufacturing process may be a process where a shaped metal powder pre-form of the intended metallic article, component or structure is pressed under heat to melt the metal powder, optionally with further treatment or finishing if desired, to form the desired metallic article or structure. An example of a suitable powder-based manufacturing process according to the third aspect of the present invention is hot isostatic pressing (HIP).

The additive manufacturing process, such as the DED additive manufacturing process may, for example, be selected from laser-based additive manufacturing (LBAM) including direct laser deposition (DLD), electron beam additive manufacturing (EBAM), laser engineered net shaping (LENS), selective laser melting (SLM), SLM three-dimensional printing (SLM 3D printing), direct metal laser sintering (DMLS), direct metal laser sintering three-dimensional printing (DML 3D printing), electron beam melting (EBM), direct metal deposition (DMD), direct metal tooling (DMT), direct metal tooling three-dimensional printing (DMT 3D printing), construction laser additive direct (CLAD) and ion fusion formation (IFF).

In a fourth aspect, the present invention provides a method of manufacturing a nickel-base superalloy according to the first aspect of the invention, the method comprising mixing the components of the superalloy in the required proportions at an elevated temperature in a melt, and allowing the molten mixture to cool to provide the superalloy.

To provide the superalloy in a suitable physical form for use in manufacture, for example as a wire, rod, other metal body or powder, conventional forming methods for such alloys may be employed. Please see the metallurgical reference texts cited above or equivalents for further details.

DETAILED DESCRIPTION OF THE INVENTION

The present disclosure provides a novel modified version of the known nickel-base superalloy CM247LC. The modifications are selected to improve the ductility of articles and structures that are produced from the alloy, namely to reduce the tendency of the articles and structures to crack, in comparison to CM247LC. Particular manufacturing methods for metal articles and structures that may suitably use the nickel-base superalloy of the present disclosure include powder-based additive manufacturing or directed energy deposition (DED) additive manufacturing processes.

A particular combination of modifications which the present inventors have found to give useful results in terms of substantially restricting cracking without compromising strength is generally the following:

reducing the content of Hf from about 1.4 wt % in CM247LC to no more than about 0.05 wt % of the alloy reducing the content of C from about 0.07 wt % in CM247LC to the range of about 0.005 to about 0.03 wt % of the alloy control of sulphur content by one or more of (a) limiting the maximum acceptable S content to 0.002 wt %, (b) controlling the S scavenger Zr within the range about 0.005-about 0.1 wt %, a higher upper end point than the nominal 0.015 wt % Zr present in CM247LC, and (c) controlling the S scavenger Mn within the range 0-about 0.6 wt %, a higher upper end point than the maximum acceptable Mn content of CM247LC, which is 0.05 wt %, or eliminating Mn from the alloy in contrast to the said maximum acceptable Mn content of CM247LC introducing about 0.2-about 1 wt % Nb content to provide gamma-prime strengthening of the alloy.

The combination of a reduction in both the C and Hf contents, with control of S content and the introduction of Nb to provide additional gamma-prime strengthening provides a novel and unpredicted solution to the problem of reducing cracking without compromising strength, in a different way compared with previous attempts to achieve a similar effect in nickel-base superalloys, such as, for example, European Patent Application No. 2949768.

Without being bound by theory, we believe that the specific selected group of simultaneous modifications in the content of the CM247LC alloy that underlie the present disclosure may improve ductility by reducing the occurrence of brittle interfaces and liquation cracking from carbides and oxy-carbides, and further that they may reduce or minimise the potential for sulphur embrittlement.

More particularly, reducing the amount of hafnium present in the alloy is believed to eliminate or minimise the formation of hafnium-based oxides, stable primary MC carbides (M=Ti, Ta) and oxidised MC or oxy-carbides that can reside at interfaces and interdendritic locations in the composition. Reducing the carbon content is believed to reduce the occurrence of MC and $M_6C$ carbides and oxy-carbide particles in the composition. Reducing the maximum permitted sulphur content and allowing for the possibility of additional S scavengers such as Zr and optionally Mn is believed to reduce the potential for sulphur embrittlement.

The nickel-base superalloy of the present disclosure retains high temperature creep resistance generally comparable to CM247LC and has a high volume of gamma-prime precipitates ($Ni_3X$, X=Al, Ta, Ti, Hf). The contents of Al and Ta are substantially retained from the composition of CM247LC.

Hafnium, when present, is expected to react with oxygen to form small oxide particles, and MC carbides (the majority of which involves Ti, Ta and Nb) during vacuum induction melting, which occurs as part of powder manufacture.

The volume fraction of the gamma-prime precipitates is considered to be important in achieving the high temperature properties of the superalloy, notably resistance to plasticity and creep deformation. Other than Ni, Al is expected to be the major element in the gamma-prime phase.

Hafnium is believed to scavenge sulphur, particularly in wrought polycrystalline nickel-based alloys, forming high melting temperature sulphide particles which improve grain boundary strength and ductility.

Further, as mentioned above, the inclusion of about 0.2-about 1 wt % niobium (Nb) is believed to form MC carbides and to partition into the gamma-prime. Thus, it can be envisaged that the inclusion of Nb to some extent compensates for the reduced amounts of Hf for preserving the material properties of CM247LC in the new alloy according to the present disclosure. The levels of Nb in the gamma-prime are preferably at least similar to the levels of Hf on the gamma-prime phase of CM247LC, and may compensate a small reduction in the Al or Ti content in the alloy according to the present disclosure, in comparison with the Al or Ti content of CM247LC. For this reason, the lower end point of the compositional ranges of Al and Ti in the alloy according to the present disclosure has been broadened in comparison with the typical range of variation around the nominal compositional values for Al and Ti in CM247LC.

In contrast to the conventional CM247LC alloy, therefore, in which hafnium and tantalum are the main metal element (M) constituents of the MC carbides, it is expected that in the new nickel-base superalloy according to the present disclosure titanium, tantalum, and niobium will be the main MC carbide formers. Tungsten (W) and molybdenum (Mo) are expected to be the main $M_6C$ carbide formers in the new nickel-base superalloy according to the present disclosure.

Because hafnium is also beneficial for scavenging sulphur, in the new nickel-base superalloy according to the present disclosure where the hafnium content is reduced, the amount of S in the composition should also preferably be lower than the typical acceptable level in CM247LC. For example, the preferred amount of S in the alloy of the present disclosure is less than 5 ppm, whereas the acceptable upper limit of S content in CM247LC is 0.003 wt % (300 ppm). The presence of Zr and optionally Mn in the alloy will also assist in reducing sulphur embrittlement, as those metals scavenge sulphur and form high temperature sulphides, with improvement of grain boundary strength and ductility.

A powder composition of, or comprising, the alloy of the present disclosure, suitable for use in an additive manufacturing process or a powder-based manufacturing process for the production of metal articles and structures, typically has a powder particle size (diameter) distribution between about 10 and about 100 μm, and the particles are typically of substantially spherical shape.

A rod or wire, or other physical form of the alloy according to the present disclosure, usable as a solid feed of metal in an additive manufacturing process, will suitably have a conventional shape and size for the particular intended use. Its manufacture will suitably be by a conventional process for making such shaped forms of nickel-base superalloys.

For additive manufacturing processes such as direct laser deposition, the powder can be placed on a metal bed and can be sintered using an energy source (for example, a laser or an electron beam). Using the nickel-base superalloy of the present it is possible to fabricate extremely complex components, for example aerospace components, and other articles or structures using well established manufacturing methods.

BRIEF DESCRIPTION OF THE DRAWINGS

The invention will now be described in more detail, for further illustration and without any limiting effect on the scope of the invention, with reference to the accompanying drawings, in which.

DETAILED DESCRIPTION OF THE DRAWINGS

Figure 1:
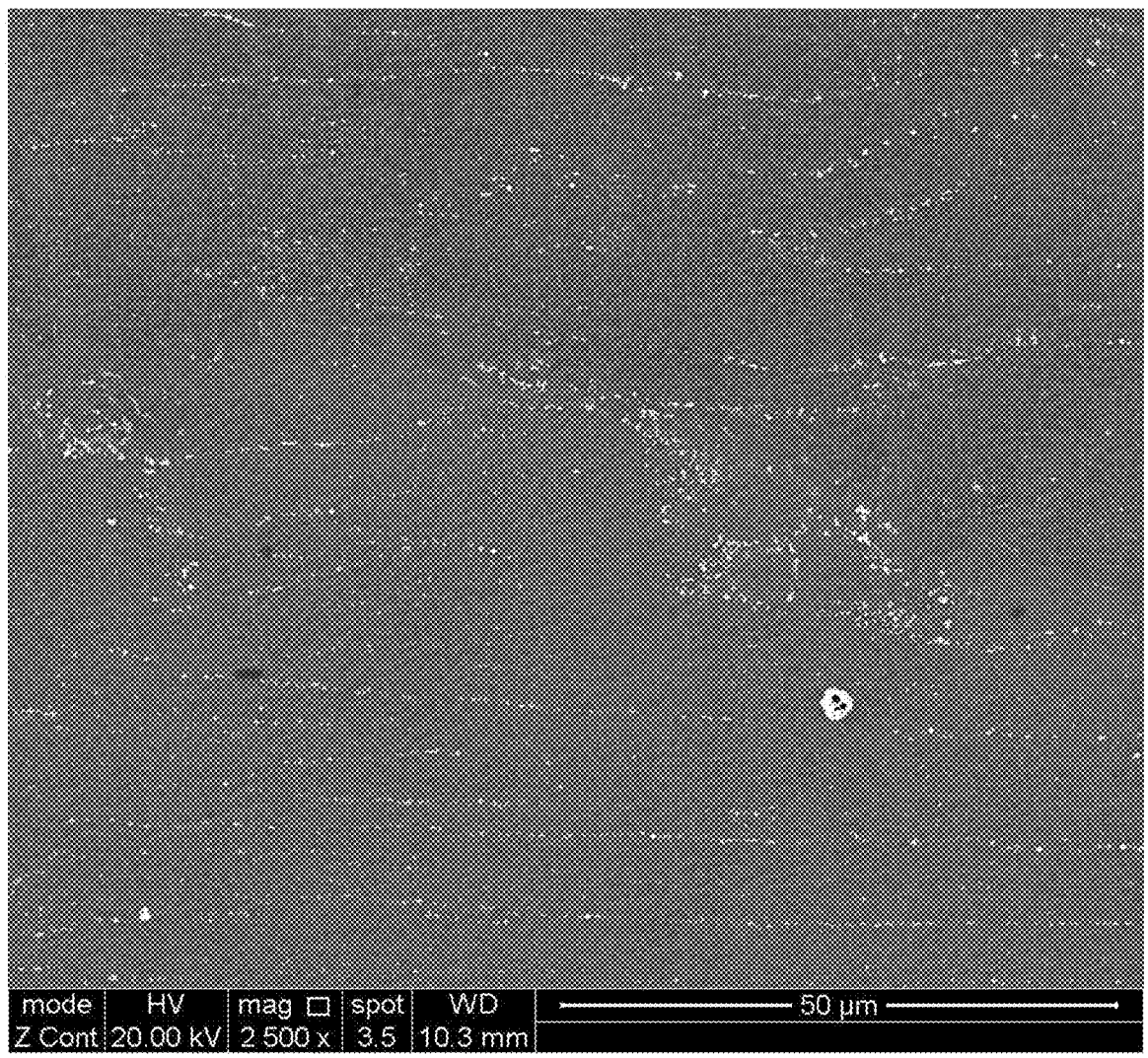
FIG. 1 a backscattered electron image of as-deposited CM247LC (prior art). The bright particles are Hf-rich oxides, predominantly Hf- and Ta-rich MC carbides and W- and Cr-rich $M_6C$ carbides.

Referring to FIG. 1, an electron image of the as-deposited prior art nickel-base superalloy CM247CL is shown. Many bright particles are visible that are aligned and reside at interfaces and interdentritic regions. The bright appearance of the particles indicates high atomic number contrast, which suggests that they are rich in hafnium (Hf) and tantalum (Ta).

Energy dispersive X-ray spectroscopy from scanning electron microscopy and transmission electron microscopy have shown that the particles consist of hafnium-rich oxides, Hf- and Ta-rich MC carbides and W- and Cr-rich $M_6C$ carbides.

Figure 2:
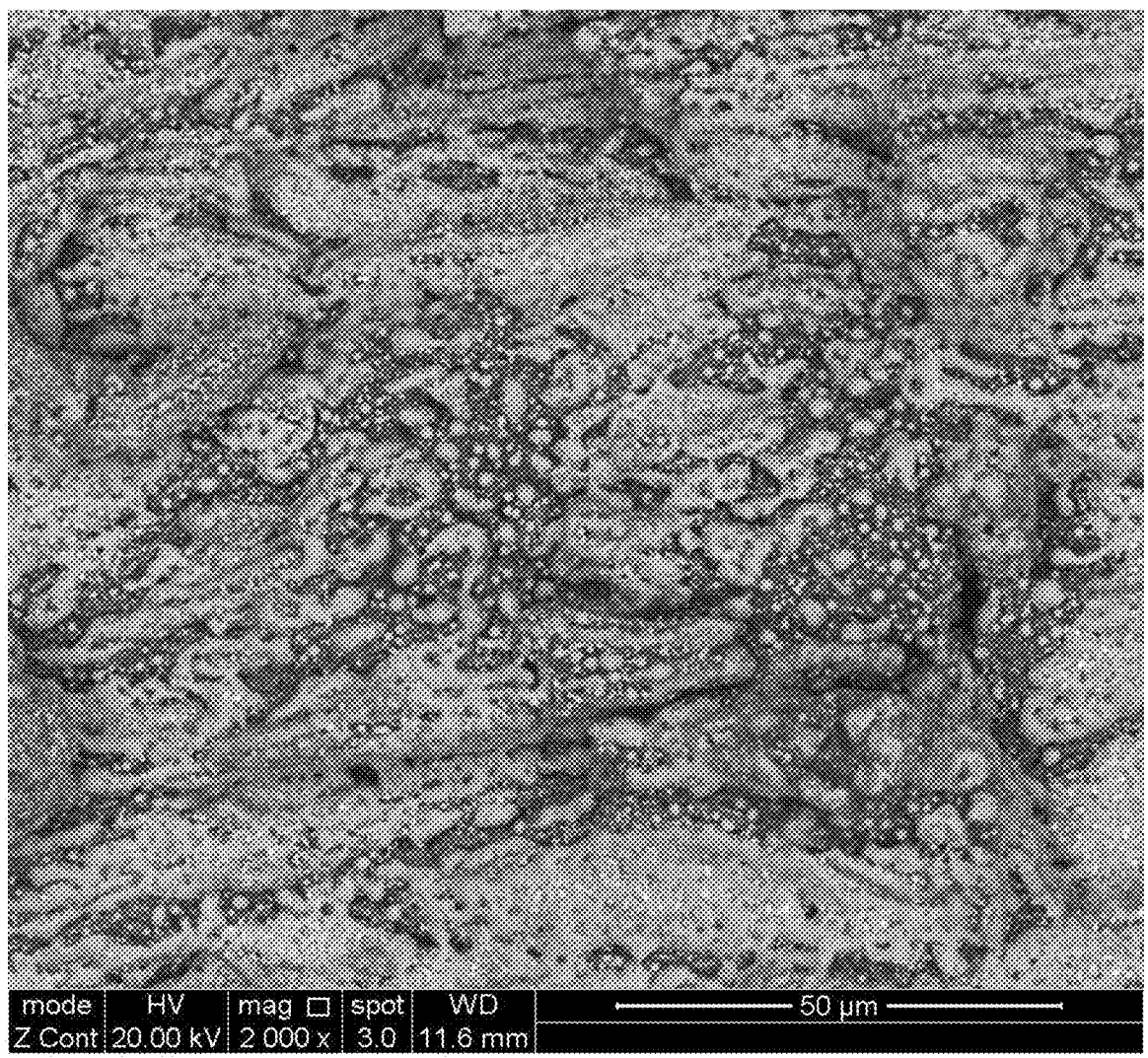
FIG. 2 shows a backscattered electron image of a fracture surface from deposited CM247LC (prior art) that cracked after hot isostatic pressing (HIP). The small bright particles are Hf-rich oxides, carbides and oxy-carbides.

FIG. 2 shows an alternative backscattered electron image of deposited CM247LC that was subsequently hot isostatic pressed before the image was obtained.

The presence and location of these carbide particles suggest that they contribute to the low ductility values that have been observed in as-deposited CM247LC.

The new alloy of the present disclosure is expected to largely retain the morphology of as-deposited CM247LC, by reason of the control of the formation of niobium, tantalum, tungsten, chromium and (if present) hafnium oxides, carbides and oxy-carbides as described above.

The present invention has been broadly described without limitation to any particular form or embodiment. Variations and modifications as will be readily apparent to those skilled in this art are intended to be within the scope of the patent application and subsequent patent.

The invention claimed is:

1. A nickel-base superalloy comprising the following composition in wt %:

| | |
|---|---|
| Cr | 8.0-8.5 |
| Co | 9.0-9.5 |
| Mo | 0.4-0.6 |
| W | 9.3-9.7 |
| Ta | 2.9-3.6 |
| Al | 4.9-5.6 |
| Ti | 0.2-1.0 |
| Hf | 0-0.05 |
| C | 0.005-0.03 |
| B | 0.005-0.02 |
| Zr | 0.005-0.1 |
| Nb | 0.2-1 |
| Mn | 0-0.6 |
| S | 0-0.002 (≤20 ppm) | the balance nickel and incidental elements and unavoidable impurities.

2. A nickel-base superalloy as claimed in claim 1, comprising the following composition in wt %:

| | |
|---|---|
| Cr | 8.0-8.5 |
| Co | 9.0-9.5 |
| Mo | 0.4-0.6 |
| W | 9.3-9.7 |
| Ta | 3.1-3.5 |
| Al | 5.1-5.5 |
| Ti | 0.5-0.9 |
| Hf | 0-0.05 |
| C | 0.005-0.02 |
| B | 0.005-0.02 |
| Zr | 0.005-0.02 |
| Nb | 0.6-1 |
| S | 0-0.0005 (≤5 ppm) | the balance nickel and incidental elements and unavoidable impurities.

3. A nickel-base superalloy as claimed in claim 1, comprising the following composition in wt %:

| | |
|---|---|
| Cr | 8.00-8.50 |
| Co | 9.00-9.50 |
| Mo | 0.40-0.60 |
| W | 9.30-9.70 |
| Ta | 3.10-3.50 |
| Al | 5.10-5.50 |
| Ti | 0.50-0.90 |
| Hf | 0-0.05 |
| C | 0.005-0.015 |
| B | 0.005-0.015 |
| Zr | 0.005-0.015 |
| Nb | 0.6-1.0 |
| S | 0-0.0005 (≤5 ppm) | the balance nickel and incidental elements and unavoidable impurities.

4. A nickel-base superalloy as claimed in claim 1, wherein the incidental elements are one or more element selected from the following (wt % unless indicated to be ppm):

| | |
|---|---|
| V | 0.10 max |
| Fe | 0.05 max |
| Si | 0.05 max |
| P | 0.005 max |
| Mg | 0.005 max |
| Cu | 0.01 max |
| N | 60 ppm max |
| O | 250 ppm max |
| Ag | 1 ppm max |
| As | 5 ppm max |
| Bi | 0.1 ppm max. |
| Cd | 2 ppm max |
| Ga | 25 ppm |
| In | 0.2 ppm max |
| Pb | 2 ppm max |
| Sb | 2 ppm max |
| Se | 1 ppm max |
| Sn | 10 ppm max |
| Te | 0.1 ppm max |
| Tl | 0.2 ppm max |
| Zn | 5 ppm max. |

5. A nickel-base superalloy as claimed in claim 2, wherein the incidental elements are one or more element selected from the following (wt % unless indicated to be ppm):

| | |
|---|---|
| V | 0.10 max |
| Fe | 0.05 max |
| Si | 0.05 max |
| P | 0.005 max |
| Mg | 0.005 max |
| Cu | 0.01 max |
| N | 60 ppm max |
| O | 250 ppm max |
| Ag | 1 ppm max |
| As | 5 ppm max |
| Bi | 0.1 ppm max. |
| Cd | 2 ppm max |
| Ga | 25 ppm |
| In | 0.2 ppm max |
| Pb | 2 ppm max |
| Sb | 2 ppm max |
| Se | 1 ppm max |
| Sn | 10 ppm max |
| Te | 0.1 ppm max |
| Tl | 0.2 ppm max |
| Zn | 5 ppm max. |

6. A nickel-base superalloy as claimed in claim 3, wherein the incidental elements are one or more element selected from the following (wt % unless indicated to be ppm):

| | |
|---|---|
| V | 0.10 max |
| Fe | 0.05 max |
| Si | 0.05 max |
| P | 0.005 max |
| Mg | 0.005 max |
| Cu | 0.01 max |
| N | 60 ppm max |
| O | 250 ppm max |
| Ag | 1 ppm max |
| As | 5 ppm max |
| Bi | 0.1 ppm max. |
| Cd | 2 ppm max |
| Ga | 25 ppm |
| In | 0.2 ppm max |
| Pb | 2 ppm max |
| Sb | 2 ppm max |
| Se | 1 ppm max |
| Sn | 10 ppm max |
| Te | 0.1 ppm max |
| Tl | 0.2 ppm max |
| Zn | 5 ppm max. |

7. A nickel-base superalloy as claimed in claim 1, in a physical form which is adapted for use in an additive manufacturing process.

8. A nickel-base superalloy as claimed in claim 1, in the form of a wire, rod or powder adapted for use in an additive manufacturing process.

9. A nickel-base superalloy as claimed in claim 1, in the form of a wire, rod or powder adapted for use in a directed energy deposition (DED) additive manufacturing process.

10. A nickel-base superalloy as claimed in claim 7, wherein the physical form is adapted for use in a manufacturing process selected from laser-based additive manufacturing (LBAM), direct laser deposition (DLD), electron beam additive manufacturing (EBAM), laser engineered net shaping (LENS), selective laser melting (SLM), SLM three-dimensional printing (SLM 3D printing), direct metal laser sintering (DMLS), direct metal laser sintering three-dimensional printing (DML 3D printing), electron beam melting (EBM), direct metal deposition (DMD), direct metal tooling (DMT), direct metal tooling three-dimensional printing (DMT 3D printing), construction laser additive direct (CLAD) and ion fusion formation (IFF).

11. A nickel-base superalloy as claimed in claim 1, in a physical form which is adapted for use in a powder-based manufacturing process.

12. A nickel-base superalloy as claimed in claim 11, in the form of a powder adapted for use in a powder-based manufacturing process.

13. A nickel-base superalloy as claimed in claim 11, in the form of a powder adapted for use in hot isostatic pressing (HIP).

14. A metal article, component or structure comprising a nickel-base superalloy comprising the following composition in wt %:

| | |
|---|---|
| Cr | 8.0-8.5 |
| Co | 9.0-9.5 |
| Mo | 0.4-0.6 |
| W | 9.3-9.7 |
| Ta | 2.9-3.6 |
| Al | 4.9-5.6 |
| Ti | 0.2-1.0 |
| Hf | 0-0.05 |
| C | 0.005-0.03 |
| B | 0.005-0.02 |
| Zr | 0.005-0.1 |
| Nb | 0.2-1 |
| Mn | 0-0.6 |
| S | 0-0.002 (≤20 ppm) | the balance nickel and incidental elements and unavoidable impurities.

15. A metal article, component or structure as claimed in claim 14, wherein the article, component or structure is an article, component or structure for use in the aerospace industry.

16. A metal article, component or structure as claimed in claim 14, which is selected from statics, turbine blades, other turbine components, and combustor components for use in the aerospace industry.

17. A method of manufacturing a metal article, component or structure which is selected from statics, turbine blades, other turbine components, and combustor components for use in the aerospace industry, which comprises applying energy to melt a nickel-base superalloy comprising the following composition in wt %:

| | |
|---|---|
| Cr | 8.0-8.5 |
| Co | 9.0-9.5 |
| Mo | 0.4-0.6 |
| W | 9.3-9.7 |
| Ta | 2.9-3.6 |
| Al | 4.9-5.6 |
| Ti | 0.2-1.0 |
| Hf | 0-0.05 |
| C | 0.005-0.03 |
| B | 0.005-0.02 |
| Zr | 0.005-0.1 |
| Nb | 0.2-1 |
| Mn | 0-0.6 |
| S | 0-0.002 (≤20 ppm) | the balance nickel and incidental elements and unavoidable impurities.

18. A method as claimed in claim 17, wherein the nickel-base superalloy is in the physical form of a powder and the energy is applied in a powder-based manufacturing process, or the nickel-base superalloy is in the form of a metal body or a powder as a metal feed and the energy is applied in an additive manufacturing process.

19. A method of manufacturing a nickel-base superalloy as defined in claim 1, the method comprising mixing the components of the superalloy in the required proportions at an elevated temperature in a melt, and allowing the molten mixture to cool to provide the superalloy.

* * * * *